(12) United States Patent
Nakano et al.

(10) Patent No.: US 8,837,895 B2
(45) Date of Patent: Sep. 16, 2014

(54) FIBER HOLDER AND FIBER LASER APPARATUS

(75) Inventors: Fumihiko Nakano, Moriguchi (JP); Tadamasa Yokoi, Kusatsu (JP); Yuichi Ishizu, Kusatsu (JP); Masao Yoshioka, Machida (JP)

(73) Assignee: Omron Corporation, Kyoto (JP)

( * ) Notice: Subject to any disclaimer, the term of this patent is extended or adjusted under 35 U.S.C. 154(b) by 290 days.

(21) Appl. No.: 13/478,660

(22) Filed: May 23, 2012

(65) Prior Publication Data

US 2012/0301097 A1  Nov. 29, 2012

(30) Foreign Application Priority Data

May 26, 2011  (JP) ................. 2011-118039

(51) Int. Cl.
  *G02B 6/00*  (2006.01)
(52) U.S. Cl.
  USPC ............................ 385/135; 385/134; 385/137
(58) Field of Classification Search
  CPC combination set(s) only.
  See application file for complete search history.

(56) References Cited

U.S. PATENT DOCUMENTS

| | | | | |
|---|---|---|---|---|
| 4,387,863 A | * | 6/1983 | Edmonston et al. | 242/118.4 |
| 5,013,121 A | * | 5/1991 | Anton et al. | 385/135 |
| 5,125,590 A | * | 6/1992 | LeCompte | 242/118.4 |
| 5,163,988 A | * | 11/1992 | Setaishi et al. | 65/402 |
| 5,263,585 A | * | 11/1993 | Lawhon et al. | 206/388 |
| 5,460,676 A | * | 10/1995 | Jensen et al. | 156/169 |
| 6,038,362 A | * | 3/2000 | Toyoda et al. | 385/137 |
| 6,174,648 B1 | * | 1/2001 | Terao et al. | 430/321 |
| 6,442,312 B1 | * | 8/2002 | Terao et al. | 385/37 |
| 6,650,821 B1 | * | 11/2003 | Koyano et al. | 385/136 |
| 6,669,126 B1 | * | 12/2003 | Albert et al. | 242/173 |
| 2002/0006786 A1 | * | 1/2002 | Mine | 455/414 |
| 2002/0187774 A1 | * | 12/2002 | Ritter et al. | 455/414 |
| 2004/0195132 A1 | * | 10/2004 | Sheetz et al. | 206/438 |
| 2004/0242267 A1 | * | 12/2004 | Walsh | 455/556.1 |
| 2006/0210230 A1 | * | 9/2006 | Kline et al. | 385/135 |
| 2008/0267575 A1 | | 10/2008 | Seifert | |
| 2008/0292261 A1 | * | 11/2008 | Kowalczyk et al. | 385/135 |
| 2009/0317046 A1 | * | 12/2009 | Marcouiller et al. | 385/135 |
| 2010/0054680 A1 | * | 3/2010 | Lochkovic et al. | 385/135 |

FOREIGN PATENT DOCUMENTS

| | | | | |
|---|---|---|---|---|
| EP | 1975660 A2 | * | 10/2008 | G02B 6/36 |
| JP | 2008-244483 | | 10/2008 | |
| WO | WO 0037980 A1 | * | 6/2000 | |

* cited by examiner

*Primary Examiner* — Michelle R Connelly
*Assistant Examiner* — Chad Smith
(74) *Attorney, Agent, or Firm* — Greenblum & Bernstein, P.L.C.

(57) ABSTRACT

A fiber holder which can wind an optical fiber easily and accurately, and hold an optical fiber in a wound state is provided. The optical fiber is accommodated in the groove (introduction portion) formed on the fiber bobbin, after that, the bobbin cover is rotated in the rotational direction of the helical groove while the optical fiber is kept in contact with the cutout formed in the bobbin cover. With this, the optical fiber can be accommodated in the groove. Thus, the optical fiber can be wound easily and accurately, and the optical fiber can be held on the fiber bobbin.

16 Claims, 10 Drawing Sheets

FIBER HOLDER AND FIBER LASER APPARATUS

CROSS-REFERENCE TO RELATED APPLICATION

This application claims benefit of priority under 35 U.S.C. §119 to Japanese Patent Application No. 2011-118039 filed on May 26, 2011, which is expressly incorporated herein by reference in its entirety.

BACKGROUND OF THE INVENTION

1. Technical Field

The present invention relates to a fiber holder and a fiber laser apparatus and, particularly, to a configuration of a fiber holder for winding an optical fiber and fixing the same.

2. Related Art

A laser processing apparatus, typically a laser marking apparatus, a welding apparatus, and a trimming apparatus, is generally configured by a laser oscillator, a driver for driving the laser oscillator, a power source for the driver, and a control board for controlling the laser. In recent years, in such a laser processing apparatus, a conventional solid state laser is progressively being replaced with a fiber laser in view of its advantages, such as a high efficiency, a high stability, and a high beam quality.

In a general fiber laser, a laser beam is amplified by a rare-earth doped fiber. In order to obtain a laser beam having a high power, the rare-earth doped fiber is required to have a certain amount of length. Therefore, configurations for accommodating optical fibers have been proposed so far.

For example, U.S. Unexamined Patent Publication No. 2008/0267575A1 (Patent Literature 1) discloses a bobbin having a circular shape which is formed by metal, such as aluminum or copper. On the side face of this bobbin, a helical groove is formed for accommodating an optical fiber. Moreover, Japanese Unexamined Patent Publication No. 2008-244483 (Patent Literature 2) discloses an optical fiber holding device in which a helical groove for accommodating an optical fiber is formed on a plain surface.

A general optical fiber used for a fiber laser is very thin, such as about 250 to 1000 μm. Particularly, in a rare-earth doped fiber, in order to perform an optical amplification and a laser oscillation, a laser beam having a high power is transmitted through the rare-earth doped fiber. When the rare-earth doped fiber is damaged, a laser beam leaks through the damaged portion, thereby, a problem of heat generation at the fiber, or heat generation at a fiber coating etc. may be caused. Accordingly, fibers should be treated very carefully.

On the other hand, in the bobbin disclosed in Patent Literature 1, a helical groove is formed on its side face. As the optical fiber becomes longer, the vertical length of the bobbin (i.e., the center axis direction of the helical groove) should be made longer. Accordingly, it is difficult to realize a compact optical fiber holder by the bobbin disclosed in Patent Literature 1. Moreover, it is difficult for the bobbin disclosed in Patent Literature 1 to visually confirm the state in which a fiber is wound. Therefore, when a part of the fiber is deviated from the groove, it would be possible to overlook the portion.

On the other hand, in the fiber holding device disclosed in Patent Literature 2, an optical fiber is held in a helical groove formed on a plain surface. However, a method for accommodating the optical fiber in the groove, i.e., a method for winding the optical fiber, is not concretely disclosed in Patent Literature 2.

SUMMARY

An object of the present invention is to provide a fiber holder in which an optical fiber can be wound easily and accurately, and the optical fiber can be held in a wound state.

In accordance with one aspect of the present invention, there is a fiber holder for holding an optical fiber used in a fiber laser apparatus, including: a fiber accommodation portion including a main surface on which a helical groove for accommodating the optical fiber is formed; an axial member fixed to the main surface so as to pass through a center axis of the helical groove; and a cover which covers at least a portion inside an outermost circumference of the helical groove within the main surface of the fiber accommodation portion. In the cover, a central aperture into which the axial member is inserted for rotating the cover about the axial member, and a cutout intersecting the helical groove from the outermost circumference to an innermost circumference, are formed.

Preferably, the fiber holder further includes a spacer which is configured so as to be inserted between the cover and the main surface of the fiber accommodation portion, and formed in a ring shape into which the axial member is inserted.

Preferably, the cover is a transparent member.

Preferably, the fiber holder further includes an excess fiber winding portion disposed on the main surface of the fiber accommodation portion so as to extend in a direction along the center axis of the helical groove, and configured to be detachable and attachable with respect to the main surface of the fiber accommodation portion. In the cover, at least one through hole for inserting the excess fiber winding portion into therethrough is formed.

Preferably, a plurality of attachment apertures for attaching the excess fiber winding portion are formed in a region inside the innermost circumference of the helical groove on the main surface of the fiber accommodation portion. The plurality of attachment apertures are disposed on a circumference (i.e., a definable circumference) about the center axis of the helical groove at even angular intervals. The at least one through hole of the cover is formed so as to overlap a part of the circumference.

Preferably, the at least one through hole of the cover includes a plurality of through holes. The part of the circumference is an arc defined by at least adjacent two attachment apertures among the plurality of attachment apertures.

Preferably, the fiber holder further includes a cover press member fixed on the cover by the axial member so as to extend in a direction transverse to the helical groove, and a central aperture for inserting the axial member therethrough is formed.

Preferably, a shape of a bottom face of the helical groove in a direction transverse to the helical groove is a curbed face.

In accordance with another aspect of the present invention, a fiber laser apparatus including: a fiber holder according to any one of the above; and an optical fiber held by the fiber holder.

According to the present invention, there can be realized a fiber holder by which an optical fiber can be wound easily and accurately, and also the optical fiber can be held in a wound state.

DETAILED DESCRIPTION

Figure 1:
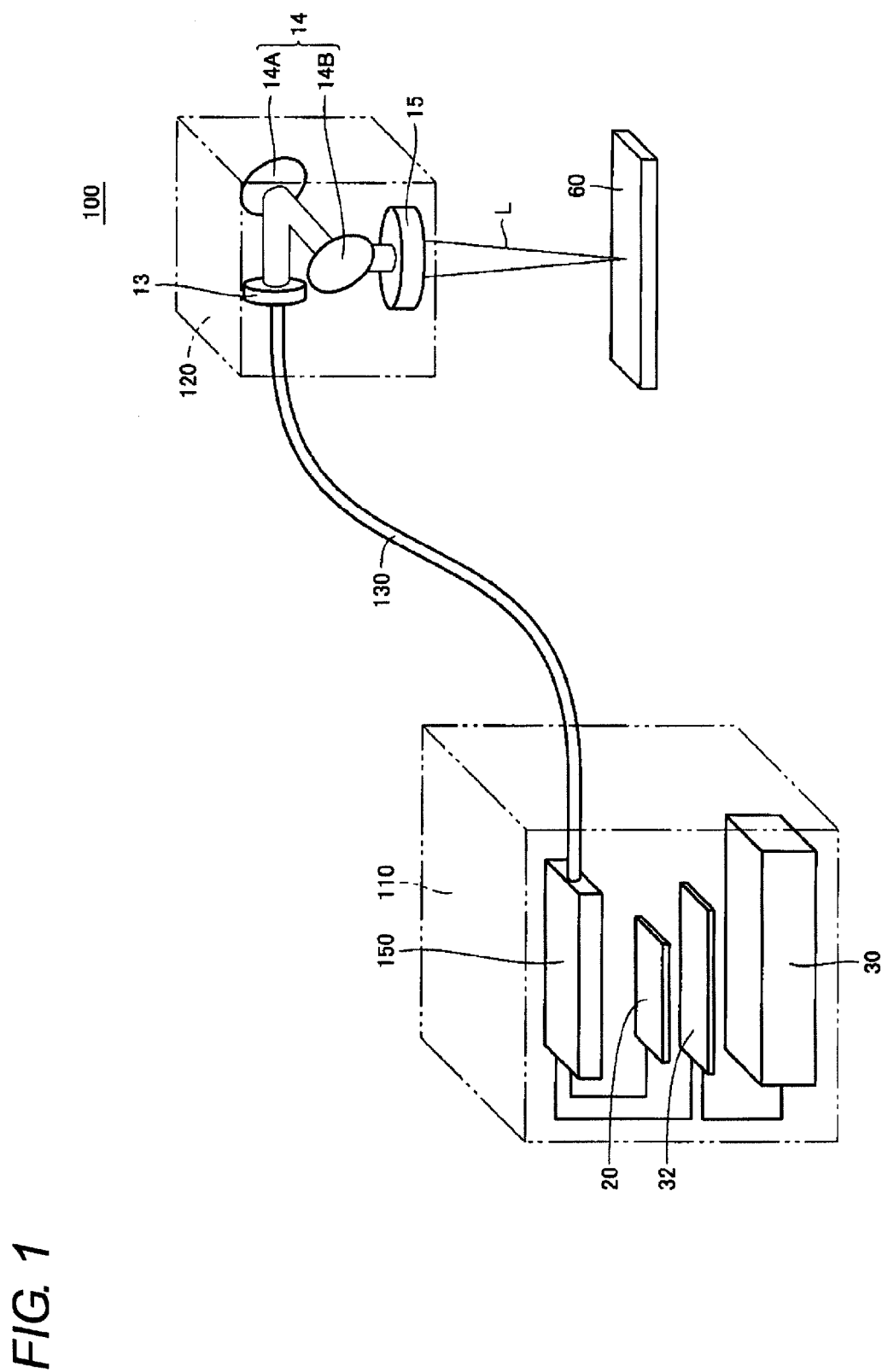
FIG. 1 is a view illustrating a schematic configuration of a laser processing apparatus according to an embodiment of the present invention.

Hereinafter, an embodiment of the present invention will be described in detail with reference to the drawings. Note that, the same or corresponding portions in the drawings are denoted by the same signs, and their descriptions are not repeated.

FIG. 1 is a view illustrating a schematic configuration of a laser processing apparatus according to an embodiment of the present invention. Referring to FIG. 1, the laser processing apparatus 100 is provided with a laser controller 110, a laser head portion 120, and a laser transmission portion 130 for transmitting a laser beam from the laser controller 110 to the laser head portion 120.

The laser controller 110 generates a laser beam and emits the generated laser beam. The laser controller 110 includes a laser oscillator 150, a control board 20, a driver 32, and a power source 30 for the driver 32. The laser oscillator 150 is driven by a driver 32 so as to perform a laser oscillation. With this, a laser beam is outputted from the laser oscillator 150. The control board 20 controls laser oscillation conditions, and an output of the laser beam and a stopping of the same.

The power source 30 for the driver drives the driver 32 by supplying electric power thereto. With this, the driver 32 drives the laser oscillator 150 so as to perform a laser oscillation.

The control board 20 controls an output of laser beam and a stopping of the same by the laser oscillator 150. Note that, the control board 20 may control the driver 32 so as to operate and stop the driver 32.

The laser head portion 120 applies a laser beam toward an object to be irradiated. The laser head portion 120 includes a collimator lens 13, a galvanometer scanner 14, and a condenser lens 15.

The collimator lens 13 enlarges a beam diameter of the laser beam transmitted from the laser controller 110 through the laser transmission portion 130 so as to bring the laser beam into a parallel beam. The galvanometer scanner 14 includes mirrors 14A, 14B, and scans the laser beam from the collimator lens 13 in two-dimensional direction. Note that, the mirrors 14A, 14B are driven by a motor (not shown).

In this embodiment, although a galvanometer mirror is adopted for a scanning apparatus for scanning a laser beam, such a scanning apparatus is not limited to a galvanometer mirror. For example, a polygon mirror, and a Micro Electro Mechanical System (MEMS) scanner, etc., can be used.

Moreover, the scanning apparatus is not limited to one which scans the laser beam in two-dimensional direction, but one which can scan the laser beam in only one-dimensional direction may be used.

The condenser lens 15 concentrates the laser beam from the galvanometer scanner 14 on the surface of the object to be processed 60.

The laser transmission portion 130 transmits the laser beam from the laser controller 110 to the laser head portion 120. As described in detail later, the laser beam from the laser transmission portion 130 is amplified at the laser head portion 120. With this, the laser beam having a power necessary for processing can be obtained.

The amplified laser beam is scanned in two-dimensional direction by the galvanometer scanner 14, and is concentrated by the condenser lens 15, so that, for example, an abrasion occurs on the surface of the object 60 to be processed. When a high energy laser beam is applied to the surface of an object, such as polymer, ceramics, glass, and metal materials, the material surface is explosively removed through decomposition, and vaporization, perspiration since bonds between molecules and atoms which constitute the material are instantaneously disbonded, so that a very sharp removal occurs without causing heat damage to the periphery. This is the phenomenon which is called abrasion. Various processes can be performed by using this abrasion.

As an example, the laser processing apparatus 100 is a laser marking apparatus. However, the process by a laser beam is not limited to marking. In other words, the laser processing apparatus according to the present invention is not limited to the laser marking apparatus. For example, the laser beam may be used for drilling, welding, cutting, thermal treatment, shape processing, and trimming, etc. Therefore, the laser processing apparatus according to the present invention is applicable to use as those laser processing apparatuses. For example, as the laser processing apparatus according to the present invention, a laser trimming apparatus, a laser repair apparatus for repairing defects of a photomask etc can be included.

Figure 2:
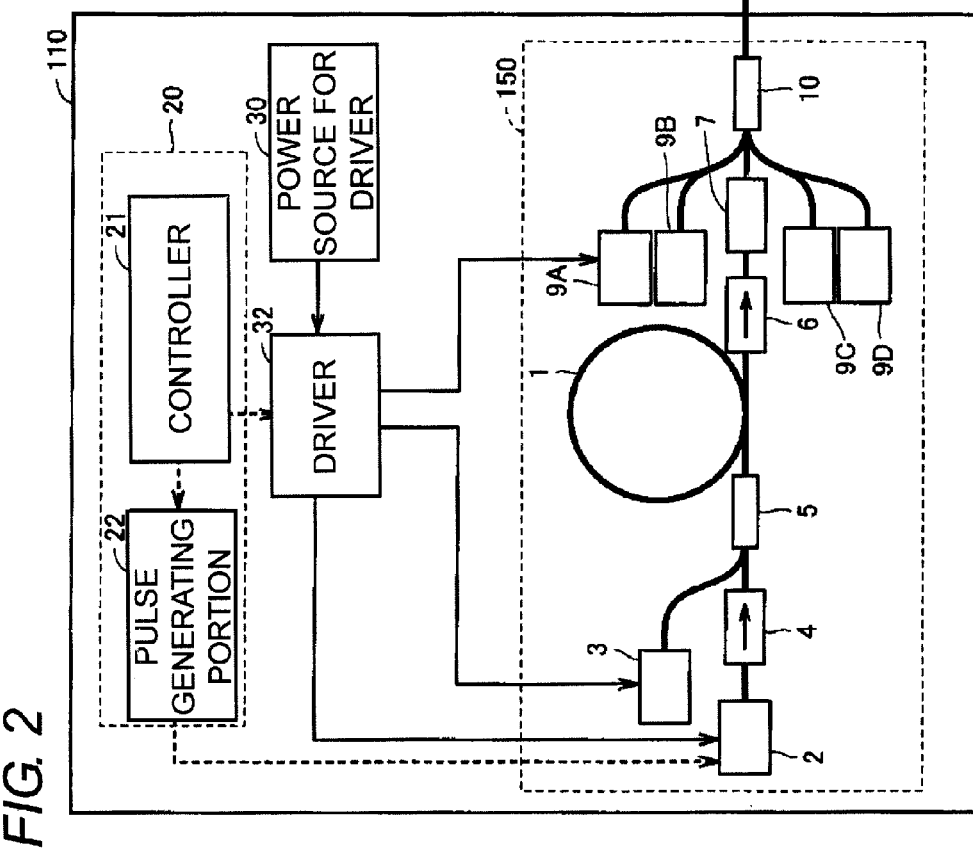
FIG. 2 is a block diagram illustrating in more detail the configuration of a laser processing apparatus 100 illustrated in FIG. 1.
Figure 2:
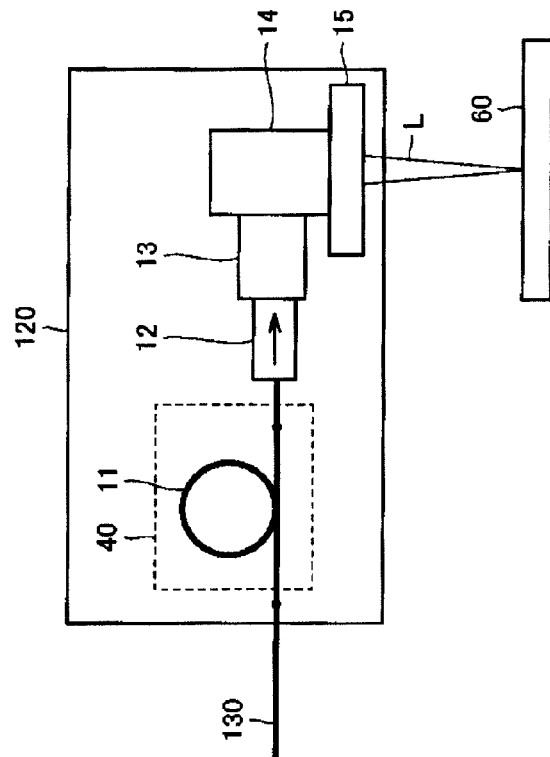

FIG. 2 is a block diagram illustrating in detail the configuration of the laser processing apparatus 100 illustrated in FIG. 1. Referring to FIG. 2, the laser controller 110 includes the laser oscillator 150, the control board 20, the driver 32, and the power source 30 for the driver. The laser oscillator 150 is provided with an optical fiber 1, laser diodes 2, 3, 9A to 9D, isolators 4, 6, couplers 5, 10, and a band-pass filter 7.

Concretely, the optical fiber 1 is a rare-earth doped fiber including a core in which a rare earth element is doped as an optical amplification component. The kind of the rare earth element is not restricted, and would be Er (erbium), Yb (ytterbium), Nd (neodymium), etc. In this embodiment, the rare earth element doped in the core of the rare-earth element fiber is Yb (ytterbium).

The laser diode 2 is a seed beam source which emits a seed beam. The wavelength of the seed beam is, for example, 1062±2 nm. The laser diode 2 is driven by the driver 32 so as to emit a seed beam in a pulse state.

The isolator 4 allows a laser beam to transmit therethrough in one direction so that a laser beam entering in the opposite direction to the direction is blocked. Concretely, the isolator 4 allows the seed beam emitted from the laser diode 2 to transmit, and the returning beam from the optical fiber 1 is blocked. With this, the laser diode 2 is prevented from being damaged.

The laser diode 3 is an excitation beam source which emits an excitation beam for exciting the rare earth element doped in the core of the optical fiber 1. The wavelength of the excitation beam is determined based on the kind of the rare earth element doped in the core of the optical fiber. For example, when the rare earth element is Yb, the wavelength of the excitation beam is, for example, 915±10 nm.

The coupler 5 combines the seed beam from the laser diode 2 with the excitation beam from the laser diode 3 so as to enter the optical fiber 1. For example, a wavelength division multiplexing (WDM) coupler or a combiner can be used as the coupler 5.

The excitation beam from the laser diode 3 which has entered the optical fiber 1 through the coupler 5 is absorbed by the rare earth element included in the core of the optical fiber 1. With this, the rare earth element is excited (brought into a transition from the ground level to an upper level) so as to obtain a state of being a population inversion. Under this state, when the seed beam from the laser diode 2 enters the core of the optical fiber 1, a stimulated emission is caused. The seed beam (pulse beam) is amplified by this stimulated emission. That is, the seed beam is amplified by making the seed beam and the excitation beam enter the fiber amplifier configured by the optical fiber 1.

The isolator 6 allows the pulse beam outputted from the optical fiber 1 to pass therethrough and blocks the beam returning to the optical fiber 1.

The band-pass filter 7 is configured to allow a laser beam having a predetermined wavelength zone pass therethrough. Concretely, the "predetermined wavelength zone" is a wavelength zone including a peak wavelength of pulse beam outputted from the optical fiber 1. When spontaneous emission light is emitted from the optical fiber 1, the spontaneous emission light is removed by the band-pass filter 7.

The laser beam, which passed through the band-pass filter 7, enters the laser transmission portion 130 through the coupler 10. The laser diodes 9A to 9D emit an excitation beam in order to amplify the laser beam, which has passed through the band-pass filter 7, at the optical fiber 11. In the first embodiment, four excitation beam sources are disposed, but the number of the laser diodes as the excitation beam sources is not limited to four. The power of the excitation beam and the number of the excitation beam sources can be determined based on the amplification factor of the pulse beam which is required for the optical fiber 11.

The coupler 10 combines the pulse beam which has passed through the band-pass filter 7 with the laser beam from the laser diodes 9A to 9D so as to enter the laser transmission portion 130.

The control board 20 includes a controller 21, and a pulse generating portion 22. The controller 21 controls the entire operation of the laser controller 110 by controlling the pulse generating portion 22 and the driver 32. The pulse generating portion 22 generates a predetermined repeated frequency and an electrical signal having a predetermined pulse width. The pulse generating portion 22 is controlled by the controller 21 so as to output the electrical signal or stop outputting of the electrical signal. The electrical signal from the pulse generating portion 22 is supplied to the laser diode 2.

The power source 30 for the driver supplies electric power to the driver 32. With this, the driver 32 supplies driving currents to the laser diodes 2, 3, 9A to 9D. Each of the laser diode 2, 3, 9A to 9D is supplied with the driving current so as to perform a laser oscillation. The driving current supplied to the laser diode 2 is modulated by the electrical signal from the pulse generating portion 22. With this, the laser diode 2 performs a pulse oscillation and outputs the pulse beam having the predetermined repeated frequency and the predetermined pulse width mentioned above as the seed beam. On the other hand, each of the laser diodes 3, 9A to 9D is provided with, for example, a driving current continuously by the driver 32. With this, each of the laser diodes 3, 9A to 9D is continuously oscillated so as to output continuous beam as the excitation beam.

Note that, although not shown in FIG. 2, there may be disposed temperature controllers for controlling the temperatures of the laser diodes corresponding to respective laser diodes. The outputs of the laser diodes can be stabilized by stabilizing the temperatures of the laser diodes by using the temperature controllers. Moreover, there may be disposed temperature controllers corresponding to the band-pass filter 7 and/or the isolator 6.

The laser transmission portion 130 transmits the laser beam, which has entered through the coupler 10, to the laser head portion 120. The laser head portion 120 is provided with the optical fiber 11, the fiber holder 40, an isolator 12, the collimator lens 13, the galvanometer scanner 14, and the condenser lens 15.

The optical fiber 11 is a rare-earth doped fiber similar to the optical fiber 1, and amplifies the laser beam transmitted from the laser oscillator 150 through the laser transmission portion 130. The fiber holder 40 is configured to wind the optical fiber 11 and hold the same.

The isolator 12 allows the laser beam outputted from the optical fiber 11 pass therethrough, and blocks the laser beam returning to the optical fiber 11. The laser beam, which has passed through the isolator 12, is outputted from the collimator lens 13 annexed to the isolator 12 and enters the galvanometer scanner 14. The galvanometer scanner 14 scans the laser beam in at least one of the directions of the X-axis and the Y-axis orthogonal to the X-axis. The condenser lens 15 concentrates the laser beam L which has been scanned by the galvanometer scanner 14.

For example, a double-clad fiber, in which clad is doubly provided around the core, may be applied as the optical fibers 1, 11. However, both of the optical fibers 1, 11 may be single-clad fibers. For example, one of the optical fibers 1, 11 may be a single-clad fiber, and the other of the optical fibers 1, 11 may be a double-clad fiber.

Figure 3:
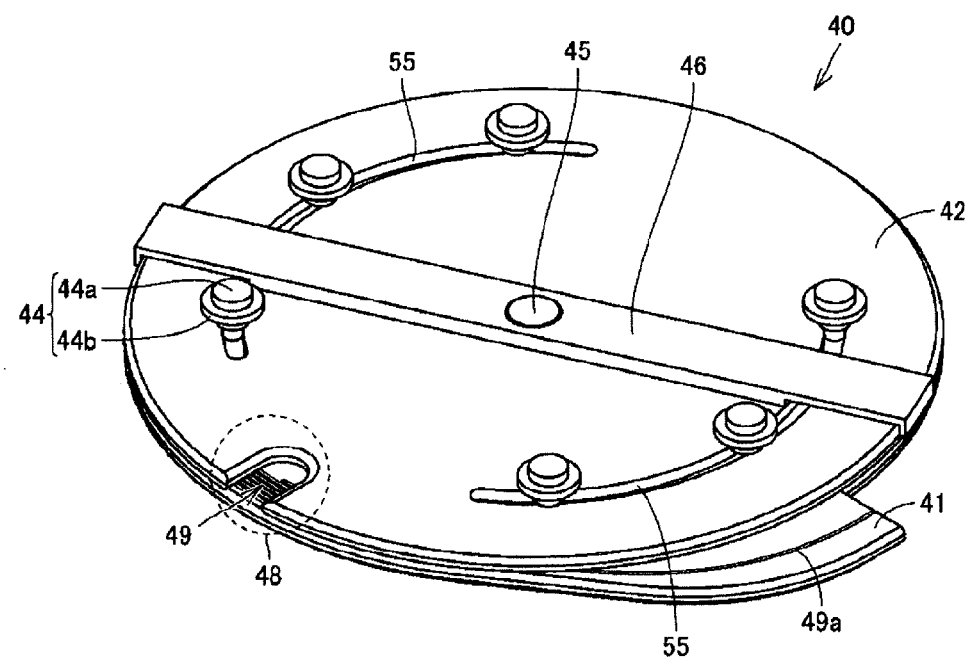
FIG. 3 is a perspective view of a fiber holder 40 according to the embodiment of the present invention.
Figure 4:
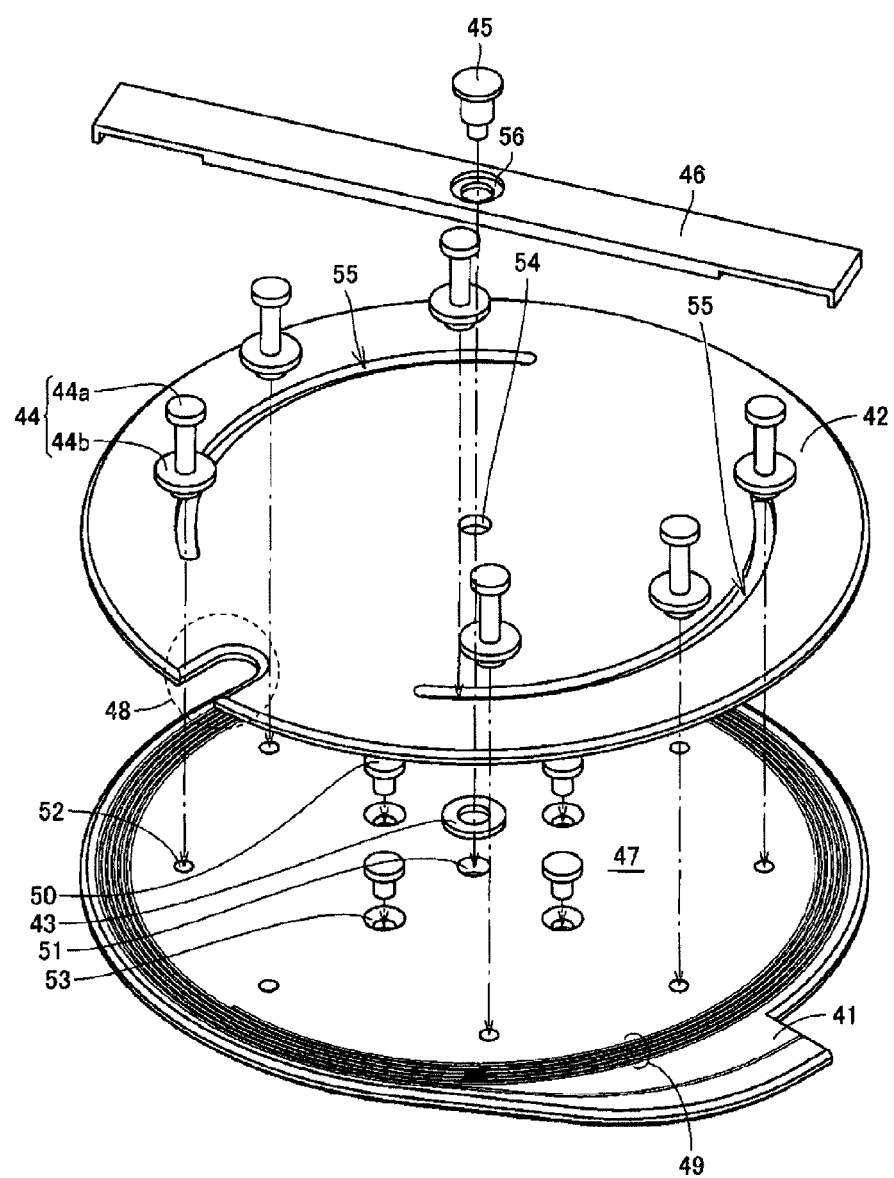
FIG. 4 is an exploded perspective view of the fiber holder 40 illustrated in FIG. 3.

Next, the fiber holder 40 according to the embodiment of the present invention is described in detail. FIG. 3 is a perspective view of the fiber holder 40 according to the embodiment of the present invention. FIG. 4 is an exploded perspective view of the fiber holder 40 illustrated in FIG. 3. Referring to FIG. 3 and FIG. 4, the fiber holder 40 is provided with a fiber bobbin 41, a bobbin cover 42, a spacer 43, an excess fiber winding portion 44, a cover fixing screw 45, and a bobbin guard 46.

The fiber bobbin 41 is formed of metal, and includes a main surface 47 on which a helical groove 49 is formed.

There are further formed on the fiber bobbin 41 a central aperture 51 for attaching a cover fixing screw 45 thereto, a plurality of attachment apertures 52 for respectively attaching a plurality of excess fiber winding portions 44 to the fiber bobbin 41, and a plurality of attachment apertures 53 for respectively inserting a plurality of positioning pins 50 therethrough in order to fix the fiber bobbin 41 to a base (not shown) etc. The center position of the central aperture 51 corresponds to the position of the central axis of the helical groove 49. The plurality of attachment apertures 52 are formed on the main surface 47 in the region inside the innermost circumference of the groove 49, and formed on the circumference around the central aperture 51.

The bobbin cover 42 is formed by a transparent material (e.g., a translucent resin), and is disposed above the fiber bobbin 41. Assuming that high power laser beam is applied to the bobbin cover 42 from a broken part of the optical fiber due to a rupture of the optical fiber, the bobbin cover 42 is preferably formed by an incombustible material.

There are formed on the bobbin cover 42 a cutout 48, a central aperture 54 for inserting the cover fixing screw 45 therethrough, and a long aperture 55 which is a through hole for inserting the excess fiber winding portion 44 therethrough. By inserting the cover fixing screw 45 into the central aperture 54 of the bobbin cover 42, the bobbin cover 42 becomes rotatable about the cover fixing screw 45. The long aperture 55 of the bobbin cover 42 is disposed on the same circumference as that for the plurality of attachment apertures 52 formed on the fiber bobbin 41. Accordingly, the long aperture 55 is formed in an arc shape.

The spacer 43 is formed in a ring shape such that the cover fixing screw 45 is inserted therethrough, and is disposed between the fiber bobbin 41 and the bobbin cover 42. A gap corresponding to the thickness of the spacer 43 is formed between the fiber bobbin 41 and the bobbin cover 42. When the spacer 43 is omitted, the bobbin cover 42 rotates while being in contact with the fiber bobbin 41, dust may be generated from the bobbin cover 42. By disposing the spacer 43, the bobbin cover 42 is prevented from making contact with the fiber bobbin 41, the generation of dust can be prevented.

The plurality of excess fiber winding portions 44 are disposed for winding an excess fiber. The excess fiber corresponds to the portion of optical fiber which cannot be accommodated in the groove 49. The excess fiber winding portion 44 includes a pin 44a, and a washer 44b through which the pin 44a is inserted.

The plurality of excess fiber winding portions 44 are configured to be detachably mounted on the fiber bobbin 41. When the bobbin cover 42 is rotated, because the excess fiber winding portions 44 are not attached to the fiber bobbin 41, the bobbin cover 42 is not prevented from rotating by the excess fiber winding portions 44. The excess fiber winding portion 44 extends on the main surface 47 of the fiber bobbin 41 in the same direction as the extending direction of the cover fixing screw 45, i.e., the direction of the central axis of the helical groove 49.

The bobbin guard 46 extends in the direction transverse to the helical groove 49. In the bobbin guard, a central aperture 56 for inserting the cover fixing screw 45 therethrough is formed. By inserting the cover fixing screw 45 into this central aperture 56, the bobbin guard 46 is attached to the upper face of the bobbin cover 42. Similar to the excess fiber winding portion 44, the bobbin guard 46 is also detachably mounted. Accordingly, the bobbin cover 42 is not prevented from rotating by the bobbin guard 46.

The cover fixing screw 45 is a shoulder screw, and its distal end portion (the small diameter portion) is the threaded portion. When the threaded portion is attached to the central aperture 51 (threaded screw hole) of the fiber bobbin 41, the cover fixing screw 45 is fixed so as to extend along the central axis of the helical groove 49. The cylindrical portion (non-threaded portion) of the cover fixing screw 45 is inserted into the central aperture 56 of the bobbin guard 46, the central aperture 54 of the bobbin cover 42, and the aperture of the spacer 43. However, the cover fixing screw is not limited to the shoulder screw, and, for example, a shoulder spacer and a screw can be also applied.

Figure 5:
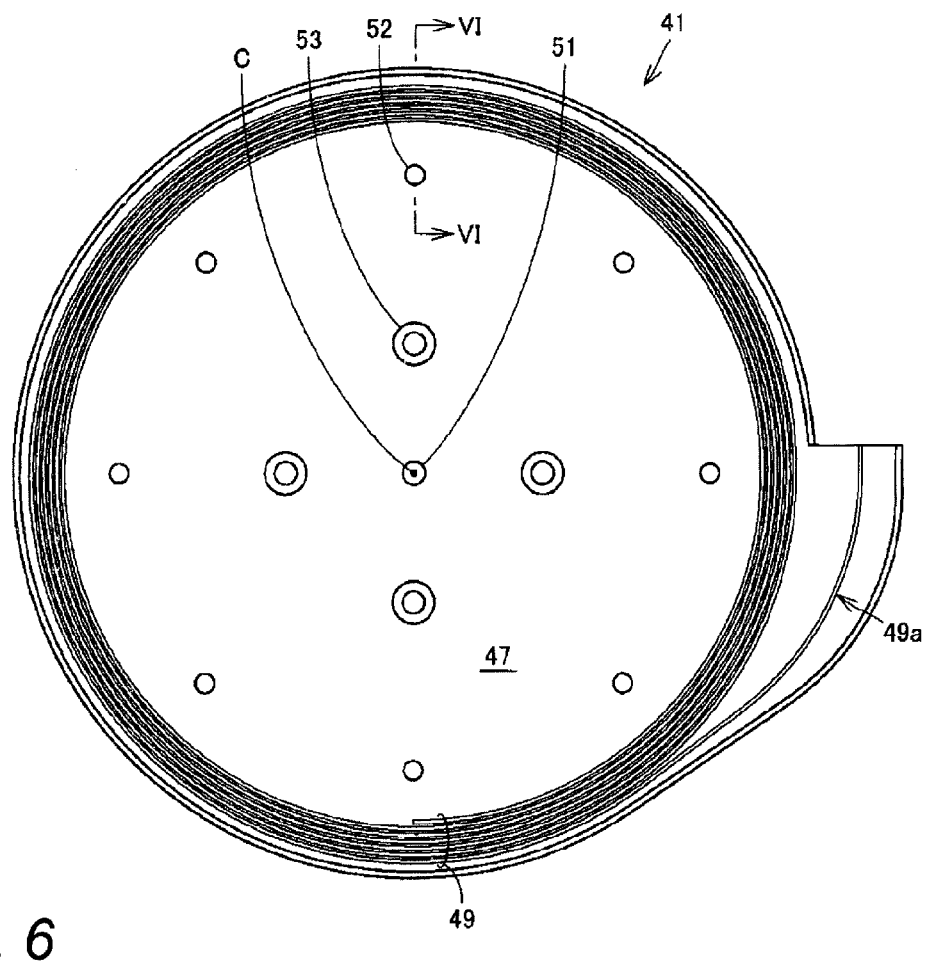
FIG. 5 is a plan view of a fiber bobbin 41.
Figure 6:
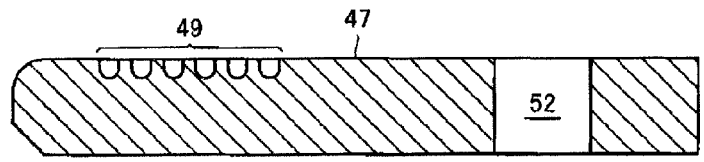
FIG. 6 is a cross-sectional view taken along line VI-VI of FIG. 5.

FIG. 5 is a plan view of the fiber bobbin 41. FIG. 6 is a cross-sectional view taken along line VI-VI of FIG. 5. Referring to FIG. 5 and FIG. 6, the point C positioned at the center of the central aperture 51 denotes the central axis of the helical groove 49. A plurality of attachment apertures 52, 53 are formed in the region inside the helical groove 49. In this embodiment, the number of the attachment apertures 52 is eight, and the number of the attachment apertures 53 is four, but the numbers of the attachment apertures 52, 53 are not particularly restricted. The plurality of attachment apertures 52 are disposed on the same circumference at even angular intervals. The plurality of attachment apertures 53 are positioned inside the plurality of attachment apertures 52, and disposed on the same circumference at even angular intervals.

The groove 49 is formed on the main surface 47 so as to describe an arc about the point C in the clockwise direction. Of course, the groove 49 may be formed in the counter-clockwise direction. The radius of curvature of the innermost circumference of the groove is set to be, for example, R=50 mm. With this, an excessive curvature due to tension of the optical fiber 11 etc. can be prevented.

Moreover, an introduction portion 49a is formed as a groove which is connected with the helical groove 49. As illustrated in FIG. 6, a curved surface processing is applied to the bottom face of the groove 49. With this, the possibility that the optical fiber is damaged when the optical fiber is accommodated in the groove 49 can be decreased. Note that, the bottom face of the groove 49 may be processed in a plane surface.

Figure 7:
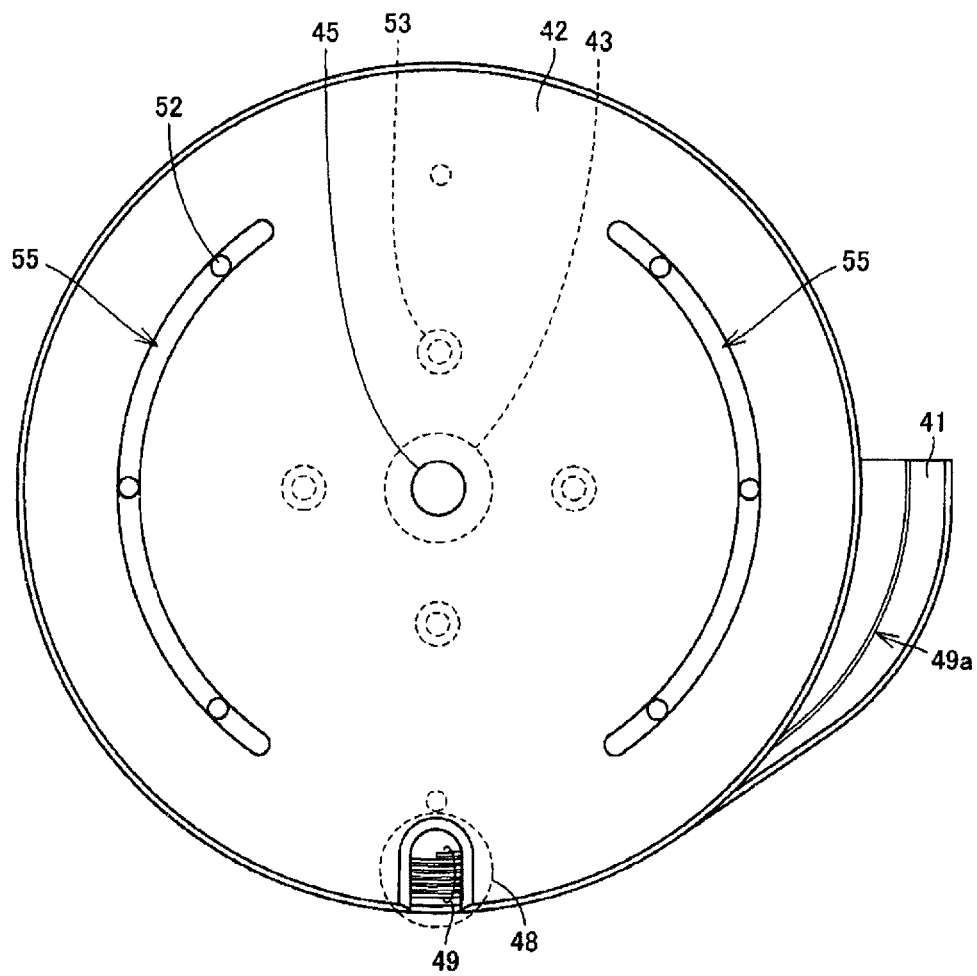
FIG. 7 is a plan view illustrating the fiber holder 40 under a state in which a bobbin cover 42 is attached to the fiber bobbin 41.

FIG. 7 is a plan view illustrating the fiber holder 40 under a state in which the bobbin cover 42 is attached to the fiber bobbin 41. Referring to FIG. 7, in the bobbin cover 42, the cutout 48 is formed so as to intersect the helical groove 49 formed on the fiber bobbin 41 from the outermost circumference to the innermost circumference of the helical groove 49. The edge portion of the cutout 48 is processed in a C-surface or an R-surface.

The long aperture 55 of the bobbin cover 42 is positioned on the circumference which is defined by the attachment apertures 52 formed in the fiber bobbin 41. The length (arc length) and the number of the long aperture 55 are not specifically restricted. However, if the number of the long apertures 55 is made smaller, the longer the length of one long aperture 55 is the more preferable. In this embodiment, the length of one long aperture 55 is longer than the length of the arc defined by three attachment apertures 52.

The position of the long aperture 55 changes according to a rotation of the bobbin cover 42. By making the length of the long aperture 55 longer, even if the position of the long aperture 55 changes, it is possible to dispose the excess fiber winding portion 44 on the fiber bobbin 41 so as to wind the excess fiber.

Figure 8:
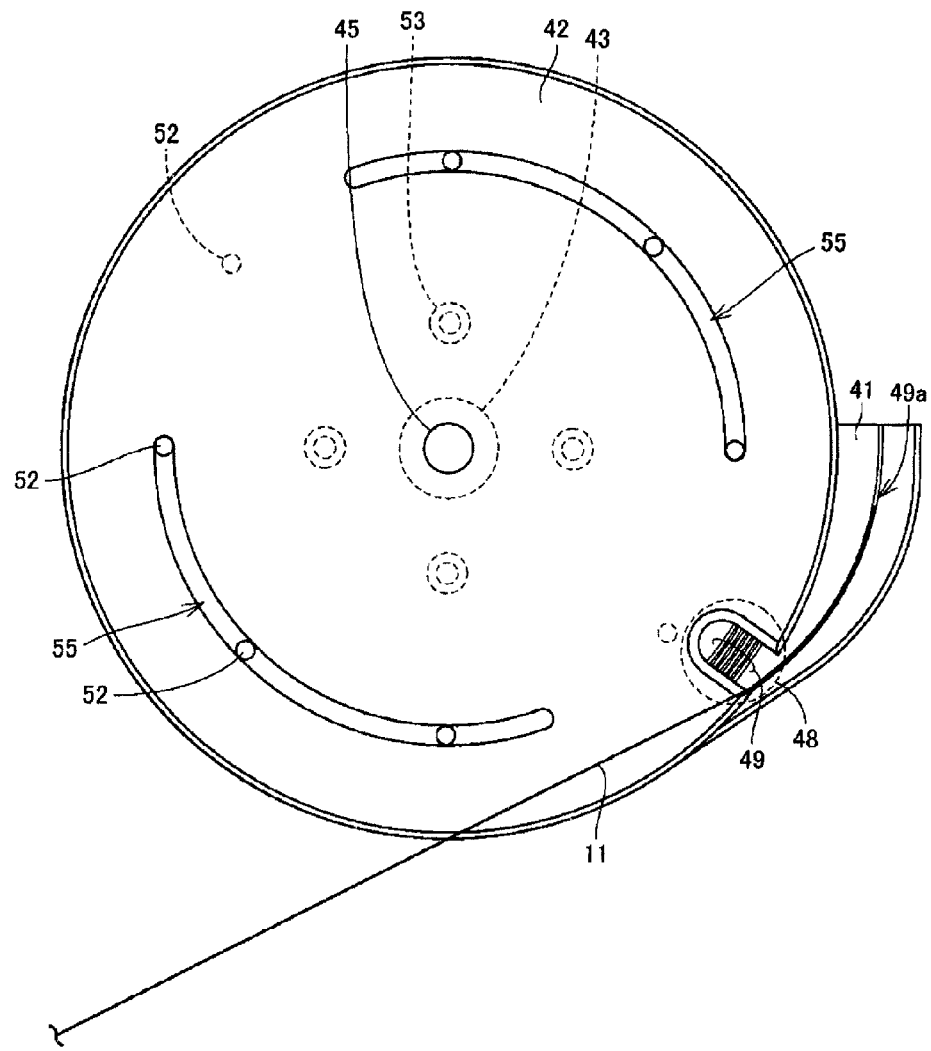
FIG. 8 is a view illustrating a first procedure for winding an optical fiber 11 around the fiber bobbin 41.

Next, a concrete method for accommodating the optical fiber 11 in the fiber bobbin 41 is described. FIG. 8 is a view illustrating a first procedure for winding the optical fiber 11 around the fiber bobbin 41. Referring to FIG. 8, the optical fiber 11 is inserted into the introduction portion 49a. Note that, in FIG. 8, in order to make it easy to understand that this figure illustrates a starting phase of winding the optical fiber, the distal end portion of the optical fiber 11 is illustrated so as to be inserted into the introduction portion 49a. However, a middle part of the optical fiber 11 may be the starting portion to be wound. Also in this case, the starting portion to be wound is accommodated in the introduction portion 49a.

Figure 9:
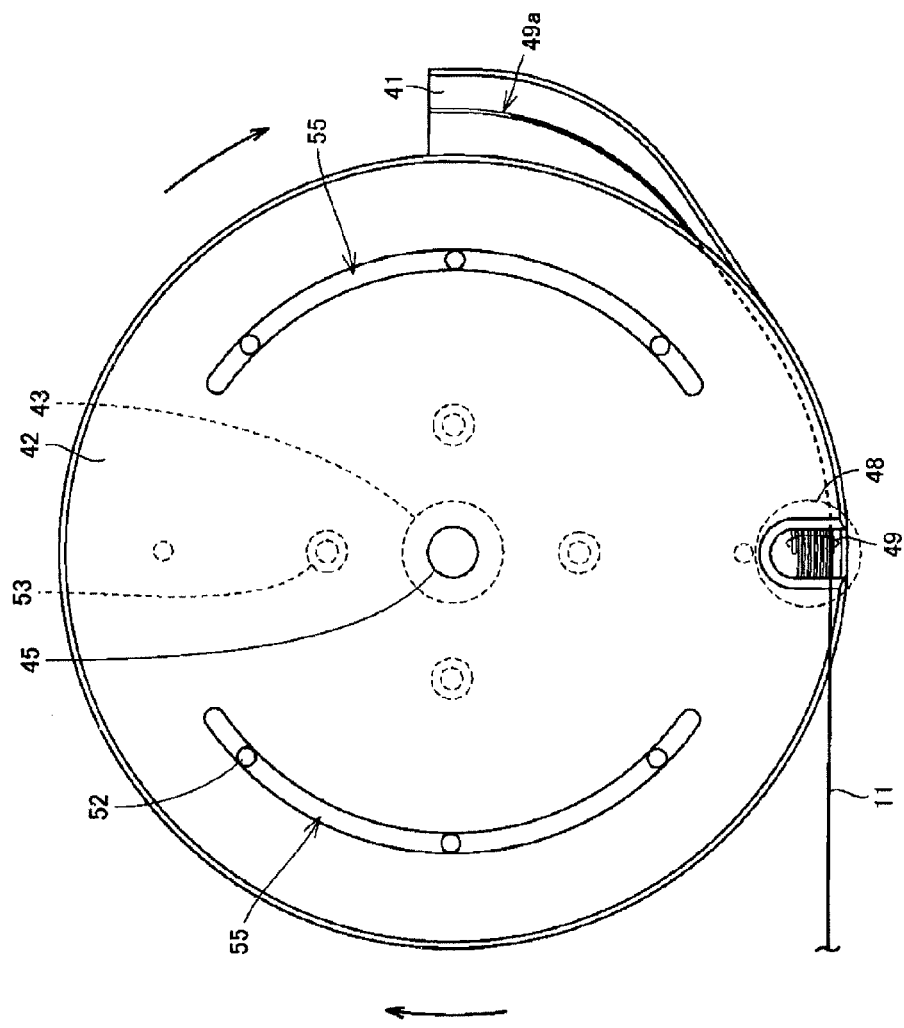
FIG. 9 is a view illustrating a second procedure for winding the optical fiber 11 around the fiber bobbin 41.

FIG. 9 is a view illustrating a second procedure for winding the optical fiber 11 around the fiber bobbin 41. Referring to FIG. 9, the bobbin cover 42 is rotated in the spiral direction of the helical groove 49, i.e., in the clockwise direction. The optical fiber 11 is pressed downward by the edge portion of the cutout 48 (the edge portion on the right side of the sheet) so as to be accommodated in the groove 49.

Figure 10:
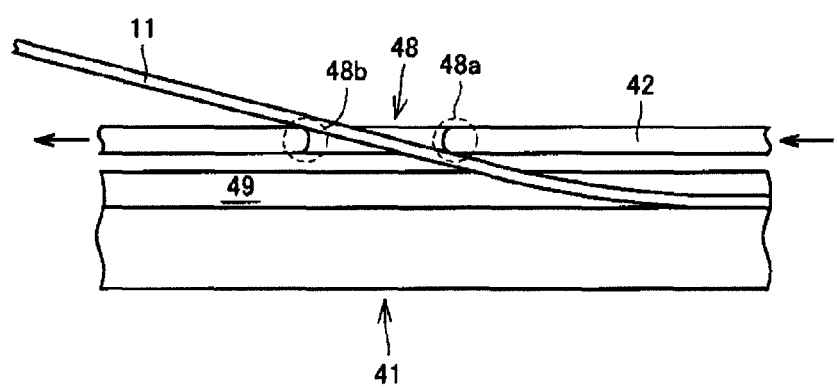
FIG. 10 is a schematic view illustrating a state in which the optical fiber 11 is accommodated in the groove of the fiber bobbin 41 by the bobbin cover 42.
Figure 11:
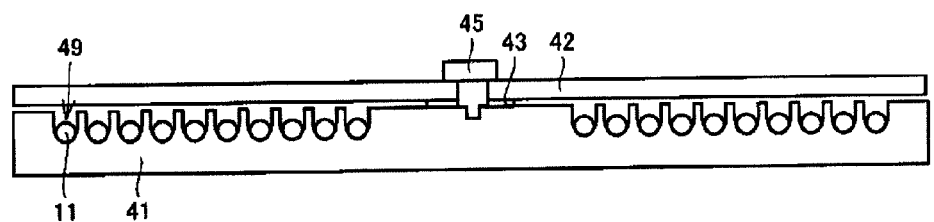
FIG. 11 is a second schematic view illustrating a state in which the optical fiber 11 is accommodated in the groove of the fiber bobbin 41 by the bobbin cover 42.

FIG. 10 is a first schematic view illustrating a state in which the optical fiber 11 is accommodated in the groove of the fiber bobbin 41 by the bobbin cover 42. FIG. 11 is a second schematic view illustrating a state in which the optical fiber 11 is accommodated in the groove of the fiber bobbin 41 by the bobbin cover 42.

Referring to FIG. 10, the bobbin cover 42 is illustrated so as to be movable to the left side, and this means that the bobbin cover 42 rotates in the clockwise direction. The optical fiber 11 makes contact with the edge portions 48a, 48b of the cutout 48 of the bobbin cover 42. By rotating the bobbin cover 42 in the clockwise direction, the edge portion 48a of the cutout 48 presses the optical fiber 11 downward. With this, the optical fiber 11 is accommodated in the groove 49. By continuously rotating the bobbin cover 42, the optical fiber 11 is wound around the fiber bobbin 41.

The edge portions 48a, 48b make contact with the optical fiber 11. Therefore, the edge portions 48a, 48b are processed into an R-surface or a C-surface. With this, the optical fiber 11 is prevented from being damaged.

As illustrated in FIG. 11, a curved surface processing is applied to the bottom face of the groove 49 such that the optical fiber 11 can be held. By processing the bottom face of the groove 49 like this, the contacting area between the surface of the groove 49 and the optical fiber 11 can be enlarged so that the radiation of heat from the optical fiber 11 can be enhanced.

Figure 12:
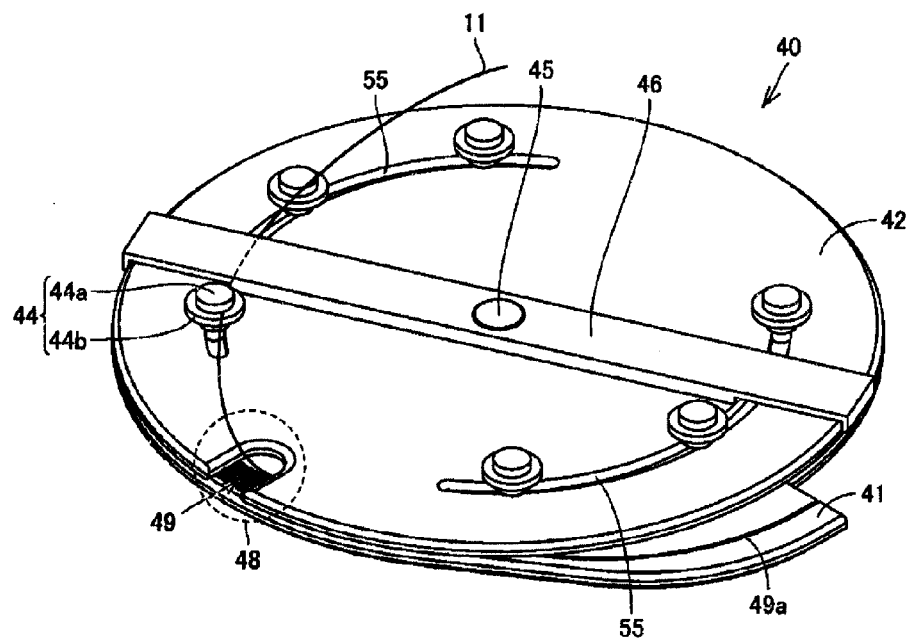
FIG. 12 is a view illustrating a state in which an excess fiber is wound.

FIG. 12 is a view illustrating a state in which the excess fiber is wound. Referring to FIG. 12, the excess fiber, which cannot be accommodated in the groove 49, is passed through the cutout 48 of the bobbin cover 42 from the terminal end of the groove 49, and is wound by the excess fiber winding portion 44. Note that, when the excess fiber is long, the excess fiber may be crossed over between a plurality of excess fiber winding portions 44.

Figure 13:
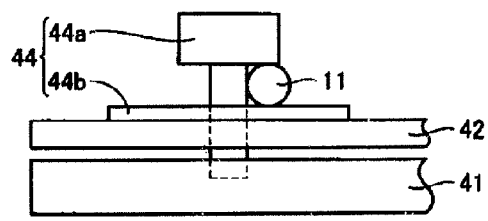
FIG. 13 is a schematic view for illustrating a winding of an optical fiber by an excess fiber winding portion 44.

FIG. 13 is a schematic view for illustrating the winding of the optical fiber by the excess fiber winding portion 44. Referring to FIG. 13, the optical fiber 11 is inserted between the head portion of the pin 44a and the washer 44b.

Referring back to FIG. 12, by the cover fixing screw 45, the bobbin guard 46 is attached on the bobbin cover 42. In order to make the wound excess fiber immobile, the excess fiber is restricted by the bobbin guard 46.

As mentioned above, the long aperture 55 (arc length) formed in the bobbin cover 42 is preferred to be longer. By making the long aperture 55 longer, the number of excess fiber winding portions 44, which can be attached to the fiber bobbin 41, can be increased. Alternatively, the flexibility of the attachment position of the excess fiber winding portion 44 can be enhanced. With this, the excess fiber having various lengths can be wound. As a result, the long optical fiber can be accommodated in a compact state. Note that, as illustrated in FIG. 3, FIG. 4, and FIG. 12, in this embodiment, the number of the excess filter winding portions 44 is equal to the number of the attachment apertures 52, but the number of the excess fiber winding portions 44 may be less than the number of the attachment apertures 52.

As mentioned above, according to the embodiment of the present invention, the optical fiber is accommodated in the groove (the introduction portion 49a) formed on the fiber bobbin 41, after that, the bobbin cover 42 is rotated in the rotational direction of the helical groove 49 while the optical fiber is kept in contact with the cutout 48 formed in the bobbin cover 42. With this, the optical fiber can be wound easily and accurately, and the optical fiber can be held on the fiber bobbin 41.

The embodiments disclosed herein should be considered to be examples in all points and non-restrictive. The scope of the present invention is defined by the claims, not the descriptions of the above-mentioned embodiments, and is intended to include all modifications within the meanings and scopes equivalent to the claims.

What is claimed is:

1. A fiber holder for holding an optical fiber used in a fiber laser apparatus, the fiber holder comprising:
   a fiber accommodation portion configured to accommodate the optical fiber, the fiber accommodation portion being defined by a main surface on which a helical groove is provided;
   an axial member fixed to the main surface so as to pass through a center axis of the helical groove; and
   a cover which covers at least a portion of the main surface that is within an outermost circumference of the helical groove,
   the cover having a central aperture into which the axial member is inserted so as to allow the cover to rotate about the axial member, and
   the cover having a cutout that intersects the helical groove from the outermost circumference of the helical groove and extends to an innermost circumference of the helical groove.

2. The fiber holder according to claim 1, further comprising a spacer which is configured so as to be inserted between the cover and the main surface of the fiber accommodation portion, and the cover being formed in a ring shape into which the axial member is inserted.

3. The fiber holder according to claim 1, wherein the cover is a transparent member.

4. The fiber holder according to claim 1, further comprising an excess fiber winding portion disposed on the main surface of the fiber accommodation portion so as to extend in a direction along the center axis of the helical groove, and the excess fiber winding portion configured to be detachable and attachable with respect to the main surface of the fiber accommodation portion,
   the cover further comprising at least one through hole configured to receive insertion of the excess fiber winding portion.

5. The fiber holder according to claim 4, wherein a plurality of attachment apertures, configured to attach the excess fiber winding portion, are formed in a region inside the innermost circumference of the helical groove on the main surface of the fiber accommodation portion,
   wherein the plurality of attachment apertures are disposed on a definable circumference about the center axis of the helical groove at even angular intervals, and
   wherein the at least one through hole of the cover is formed so as to overlap a part of the definable circumference.

6. The fiber holder according to claim 5, wherein the at least one through hole of the cover comprises a plurality of through holes, and
   wherein the overlap part of the definable circumference includes an arc defined by at least adjacent two attachment apertures among the plurality of attachment apertures.

7. The fiber holder according to claim 1, further comprising a cover press member fixed on the cover by the axial member so as to extend in a direction transverse to the helical groove, and the cover press member having a central aperture configured to receive the axial member therethrough.

8. The fiber holder according to claim 1, wherein a shape of a bottom face of the helical groove in a direction transverse to the helical groove is a curved face.

9. A fiber laser apparatus, comprising:
the fiber holder according to claim 1; and an optical fiber held by the fiber holder.

10. A fiber laser apparatus, comprising:
the fiber holder according to claim 2; and an optical fiber held by the fiber holder.

11. A fiber laser apparatus, comprising:
the fiber holder according to claim 3; and an optical fiber held by the fiber holder.

12. A fiber laser apparatus, comprising:
the fiber holder according to claim 4; and an optical fiber held by the fiber holder.

13. A fiber laser apparatus, comprising:
the fiber holder according to claim 5; and an optical fiber held by the fiber holder.

14. A fiber laser apparatus, comprising:
the fiber holder according to claim 6; and an optical fiber held by the fiber holder.

15. A fiber laser apparatus, comprising:
the fiber holder according to claim 7; and an optical fiber held by the fiber holder.

16. A fiber laser apparatus, comprising:
the fiber holder according to claim 8; and an optical fiber held by the fiber holder.

\* \* \* \* \*